United States Patent [19]
Scherf et al.

[11] 3,780,859
[45] Dec. 25, 1973

[54] APPARATUS AND METHOD FOR DISPLAYING THE MINIMUM THICKNESS OF A DIELECTRIC MEMBER MEASURED BY A RADIO FREQUENCY THICKNESS GAUGE

[75] Inventors: Gerald F. Scherf, Holland, Ohio; Robert D. Kohler, Temperance, Mich.

[73] Assignee: Owens-Illinois, Inc., Toledo, Ohio

[22] Filed: Feb. 8, 1973

[21] Appl. No.: 330,511

[52] U.S. Cl............ 209/73, 209/111.5, 324/58.5 A, 250/83.3 R
[51] Int. Cl............................................. B07c 5/08
[58] Field of Search............... 209/73, 111.7, 111.6, 209/111.5; 324/58.5 A; 250/83.3

[56] References Cited
UNITED STATES PATENTS
3,708,064  1/1973  Schepler et al...................... 209/73
3,393,799  7/1968  Schmersal............................ 209/73

Primary Examiner—Allen N. Knowles
Assistant Examiner—Gene A. Church
Attorney—Steve M. McLary et al.

[57] ABSTRACT

Apparatus and method for displaying the minimum thickness of a glass container which is measured for thickness by a radio frequency thickness gauge. One type of thickness measuring device for glass containers uses the attenuation of a radio frequency signal as a linear measure of thickness in terms of voltages. The output voltage is scaled to obtain a voltage which is numerically equal to the value of thickness of the container in thousandths of an inch. The thickness of the container may vary over a range of thicknesses. This invention will hold the minimum thickness measured for a particular container and display this, in terms of the scaled voltage, as a digital number. This aids in detecting and diagnosing thickness flaws in glass containers. The circuit for holding the minimum thickness is erased of its previous reading and reset to accept a new minimum thickness as the measurement of a new container is begun.

12 Claims, 1 Drawing Figure

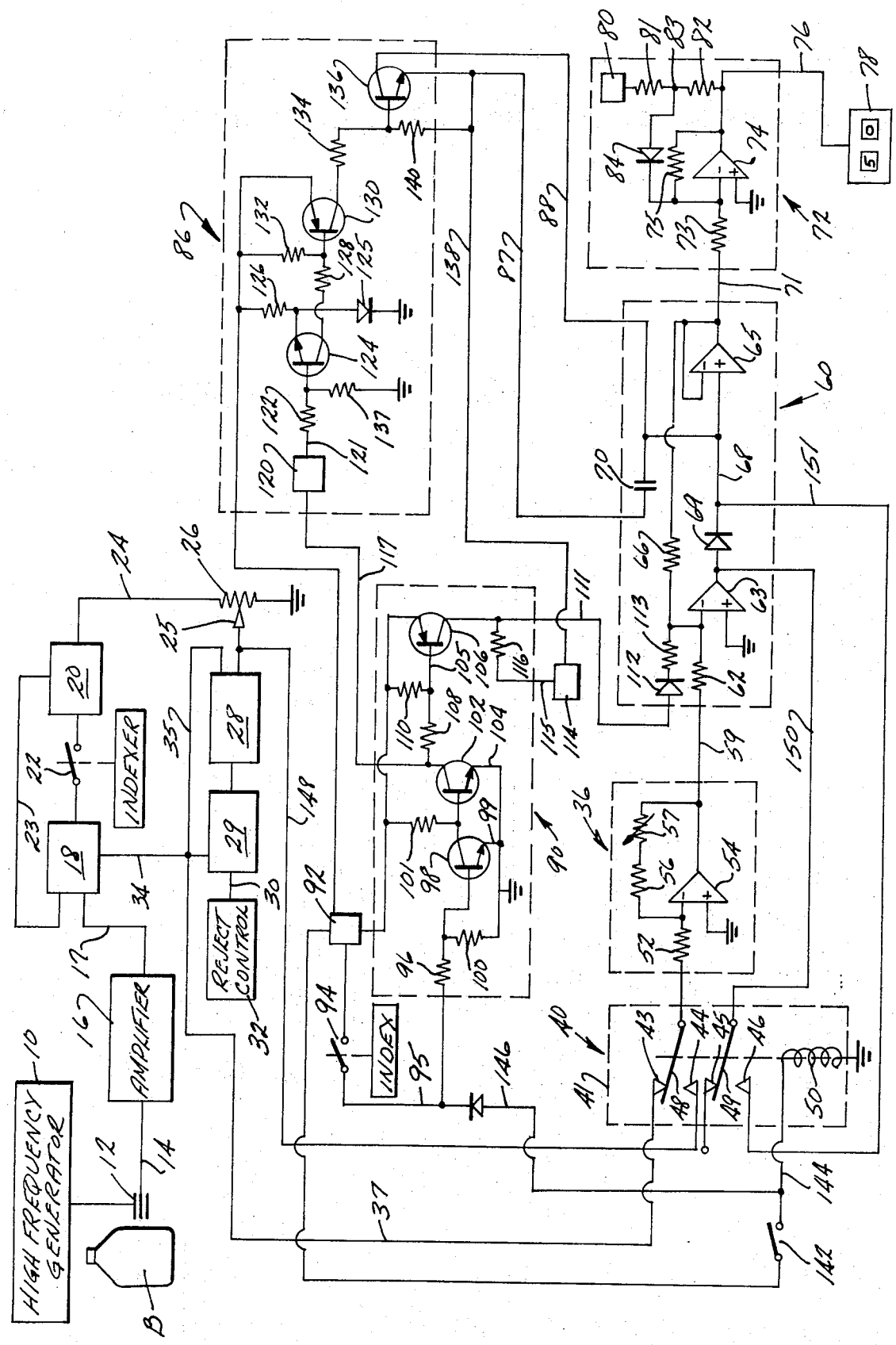

APPARATUS AND METHOD FOR DISPLAYING THE MINIMUM THICKNESS OF A DIELECTRIC MEMBER MEASURED BY A RADIO FREQUENCY THICKNESS GAUGE

BACKGROUND OF THE INVENTION

This invention generally relates to the inspection of glass containers. More specifically, this invention relates to the measurement of the thickness of the sidewalls of glass containers using radio frequency energy. Most particularly, this invention relates to circuits for holding the minimum thickness of a glass container that is measured and displaying this minimum thickness as a digital number representing the minimum thickness in thousandths of an inch or millimeters.

One type of radio frequency glass thickness gauge is disclosed in U.S. Pat. No. 3,708,064. This gauge was originally believed to have a linear voltage versus thickness relationship. However, operational experience showed the actual relationship to be nonlinear. A co-pending application, Ser. No. 328,453, filed Jan. 31, 1973, teaches a circuit for linearizing the output signal of the gauge taught in U.S. Pat. No. 3,708,064. The present invention utilizes a linear voltage versus thickness signal to hold the minimum value of glass thickness measured for a particular container and display this thickness as a digital number which is the minimum thickness in thousandths of an inch. The actual thickness signal is first scaled to obtain a voltage which is numerically equal to the thickness in thousandths of an inch.

SUMMARY OF THE INVENTION

This invention is an improvement in an apparatus of the type which measures the thickness of articles made of a dielectric material by measuring the voltage attenuation of a radio frequency field passing through the article. In this apparatus, a linear article thickness signal voltage is generated by subtracting a compensated reference signal, which is a measure of the field signal with no article present, from the signal received when an article is present. In the improvement, a scaling means amplifies the article thickness signal voltage a pre-selected amount to obtain an output signal voltage having a numerical value substantially equal to the numerical value of thickness of the article. Means connected to the output signal of the scaling means holds the minimum value of thickness of each article measured. A digital display means, connected to the output of the means for holding the minimum thickness displays, as a numerical output, the minimum article thickness for each article measured. A reset means erases or resets the means for holding the minimum article thickness to accept a new minimum thickness as the measurement of a new article begins. A gate means generates a signal, in response to the beginning of the measurement of a new article, to cause the reset means to operate.

BRIEF DESCRIPTION OF THE DRAWINGS

FIG. 1 is a schematic circuit diagram of the apparatus of the present invention.

DETAILED DESCRIPTION OF THE DRAWINGS

This invention is an improvement in an apparatus for inspecting dielectric members such as that shown in U.S. Pat. No. 3,708,064, the teachings of which are hereby incorporated by reference. For convenience in reference, the cited patent will hereinafter be referred to as the Schepler patent. The Schepler patent teaches a device which is useful for measuring the thickness of dielectric members, particularly glass containers. The present invention allows one to hold the minimum thickness level which is measured on a glass container during an inspection cycle and display this minimum thickness as a digital number to aid in diagnosing manufacturing faults which lead to glass containers whose thickness is under the minimum allowed. It should be realized that the circuits which make up the present invention will operate only with a linear voltage versus thickness relationship. In operation, the actual output of the Schepler gauge has been found to be a relatively nonlinear thickness versus voltage relationship. Therefore, the present invention must be used with the invention taught in a co-pending application, Attorney's docket number S–12953, having an inventor in common with the present application, which teaches a method and apparatus for linearizing the nonlinear output of the Schepler gauge. The basic operational functions of the Schepler gauge and the improvement disclosed in Case Attorney's docket number S–12953, are substantially identical, and the description of the basic gauge operation will be made with reference to the Schepler disclosure. The elements of the Schepler patent are shown in block diagram form in FIG. 1, and reference should be had to the Schepler patent and to co-pending application Attorney's docket number S–12953, for the exact details of the configuration of these elements.

Referring now to FIG. 1, a high frequency signal is provided by a generator 10 connected to a conductive sleeve 12 which forms a radio frequency antenna. The high frequency signal may be of the order of 13,560,000 c.p.s. to establish a radio frequency field which extends outwardly from the front face of the antenna 12 into the region of the sidewall of a container B being gauged. This field will have a particular strength and shape, depending upon the dielectric of the material positioned in front of the antenna 12. When a container B has moved into the inspection station, the field will be distorted to a certain extent, the field strength will be changed, and the amplitude of the high frequency signal induced in a probe 14 will be changed, depending upon the thickness of the dielectric material in front of the antenna 12. Thus, the magnitude of the voltage induced in the probe 14, which is positioned coaxially within the antenna 12, varies substantially with the variations in the thickness of the glass being gauged.

It should be understood at this point that the circuit shown in FIG. 1 is a circuit for a single channel of inspection. That is, the circuit shown in FIG. 1 will inspect substantially one vertical region of a container B around the circumference of the container B as the container B is rotated. However, the circuit of FIG. 1 may be duplicated several times if it is desired to obtain measurements at a number of vertical locations throughout the height of a particular container B. In addition, as is conventional practice, the power supplies to some active elements within the circuit shown in FIG. 1 have been omitted for the sake of clarity. Those skilled in the art will readily recognize the necessity for such power supplies and their connections to such elements as require a power supply. Further- An amplifier 16 is connected to receive the output from the probe 14 and provides a direct current voltage output that is related by amplitude to the amplitude of the high frequency input received from the probe 14. The output of the amplifier 16 is connected to the input of a summer circuit 18 by suitable electrical wiring 17. The summer circuit 18 is connected to the input of an integrating circuit 20 through a switch 22. As explained in the Schepler patent, the switch 22 is closed only during periods when the thickness of a container B is not being gauged, and the combination of the summer circuit 18 and the integrating circuit 20 allows the generation of a refererence voltage which indicates a glass thickness of zero. This reference voltage includes all of the changes that may have occurred in the external machine-mounted components in the system or in the ambient effects that may change the level of voltages produced by the system, the ambient temperature, relative humidity, the accumulation of dirt on the antenna 12 or the probe 14, or changes in the configuration of the probe 14 itself. When the system then processes a signal received when glass is present in front of the probe 14, the automatically compensated reference voltage may be used as a reference to be compared with the input voltage to enable the summer circuit 18 to provide a thickness voltage which is a true measure of the thickness of the glass in front of the probe 14. In addition, the automatically compensated reference voltage is also utilized to provide or establish an automatically compensated reject reference voltage. The reference voltage appears as outputs from the integrating circuit 20 on electrical lines 23 and 24. A potentiometer 26, having a movable tap 25, is connected to the integrating circuit 20 through the electrical wiring 24. Movement of the tap 25 enables selection of a reject level which corresponds to a minimum glass thickness which is acceptable; for example, forty thousandths of an inch. Since the voltage supplied to the potentiometer 26 is automatically compensated, the reject reference voltage derived from the tap 25 will also be automatically compensated. Finally, two comparator circuits 28 and 29 act as a means for comparing the output of the summer circuit 18 with the reject reference signal to provide a reject signal when the thickness of the article is below a minimum acceptable thickness set by the magnitude of the reject reference signal. This function is fully explained in the Schepler patent. If a defective container B is detected, an output from the second comparator circuit 29 appears on an electrical output line 30 and is connected to a reject control mechanism 32. The thickness output signal from the summer circuit 18 appears on an electrical line 34. This line is connected directly to one of the comparator circuits 29. In addition, a second electrical line 35, connected to the electrical line 34, is connected into the first of the comparator circuits 28.

The thickness signal leaving the summing circuit 18 on the electrical line 34 is connected to a scaling means 36, for amplifying the thickness signal a pre-selected amount to obtain a numerical value for the voltage representing the thickness which is substantially numerically equal to the thickness of the article, by a suitable electrical line 37. The normal operational limits of this system are such that a glass thickness of one-hundred thousandths of an inch is equivalent to 7 volts. As explained in co-pending application Attorney's docket number S–12953, this is a linear relationship, which allows one to readily change scales without distorting the actual informational content of the thickness signal. Thus, for convenience in reading this particular gauge, the actual voltage thickness signal carried by the electrical output line 34 is modified by the scaling means 36. By way of example, a glass thickness of forty thousandths of an inch gives an actual thickness voltage reading of approximately 2.8 volts. However, for digital display, it would be desirable for a voltage of forty thousandths of an inch to be numerically equal to a voltage of 4 volts or 0.4 of a volt, or 40 volts. The scaling means 36 actually operates in terms of volts rather than tenths of a volt or tens of volts, and therefore will convert the actual voltage reading of 2.8 volts for forty thousandths of an inch to a reading of 4 volts. This scaling is peformed for each value of the glass thickness voltage which enters the scaling means 36, and is, of course, done on a continuous basis, since the glass thickness voltage signal is a continuous signal during the gauging or measuring cycle. It will be noted that the glass thickness signal transmitted through the line 37 is not directly connected to the scaling means 36, but rather is connected first to a switching means 40 for connecting either one of two alternative input signals to the scaling means 36. The switching means 40 is actually an optional feature in this particular invention and may be safely omitted without distorting the true operational purpose of the invention. However, it is included for convenience sake, since it provides a relatively simple method for calibration, as will be explained later. The switching means 40 is basically a conventional normally closed electrical relay 41 which has contained within it two sets of contact pairs 43 and 44 and 45 and 46. Movable switch arms 48 and 49 associated with the contact pairs 43, 44 and 45, 46 are normally respectively connected to the contacts 43 and 45. The functioning of the relay 41 is conventional and is controlled by an operating coil 50 contained within the relay 41. So long as the coil 50 is de-energized, the contacts 43 and 45 will be connected through their movable switch arms 48 and 49 to the output of the relay 41. The switch arm 48 is connected to the scaling means 36. The output line 37 which carries the voltage thickness signal is connected to the contact 43 of the contact pair 43,44. When the coil 50 of the relay 41 is energized, the movable switch arms 48 and 49 will be moved and will then be in contact with the contacts 44 and 46.

The input signal to the scaling means 36 is connected through a series input resistor 52 to the negative input terminal of an operational amplifier 54. A fixed resistor 56 is connected in a feedback loop between the output terminal of the operational amplifier 54 and the negative input terminal of the operational amplifier 54 to which the resistor 52 is connected. In addition, a variable resistor 57 is connected in series with the fixed resistor 56. The variable resistor 57 serves a calibration function to be described later. In addition, this gauge may be used in foreign countries as well as in the United States. In such cases, the digital readout should be in millimeters rather than in thousandths of an inch. Under these circumstances, it is necessary to modify the scaling factor of the scaling means 36. To this end, the variable resistor 57 is used to allow simple adjustment of the scaling means 36 such that its output will be a voltage which is numerically equal to the thickness of the container in millimeters rather than thousandths of an inch. The positive input terminal of the operational amplifier 54 is connected to ground. The output of the operational amplifier 54 is a wire 59 which carries on it a voltage signal which is numerically equal to the thickness of a glass container B which is being gauged. The output wire 59 is connected to a means 60 for holding the minimum value of thickness of each article inspected as represented by the thickness voltage signal. With respect to the means 60 for holding the minimum value of thickness of each article inspected, a first input resistor 62 is connected in series with the output wire 59 from the scaling means 36 to the negative input terminal of a first operational amplifier 63. The operational amplifier 63 is used to invert the sense or sign of the thickness signal to a negative level in this particular example. The output terminal of the first operational amplifier 63 is connected to the positive input terminal of a second operational amplifier 65, which serves as an isolation output amplifier. A fixed feedback resistor 66 is connected between the output terminal of the second operational amplifier 65 and the negative input terminal of the first operational amplifier 63. The numerical resistance values of the two resistors 62 and 66 are substantially equal and serve to give a unit amplification through the two-amplifier combination made up of the amplifiers 63 and 65. Connected in series, in an electrical line 68 which connects the output of the first operational amplifier to the positive input terminal of the second operational amplifier 65, is a diode 69. Connected into the electrical line 68 between the diode 69 and the positive input terminal of the second operational amplifier 65 is a capacitor 70. As has been explained previously, the maximum voltage which will be transmitted from the output of the first operational amplifier 63 is approximately 10 volts, corresponding to a glass thickness of one-hundred thousandths of an inch. In this example, this is actually a negative or −10 volts. The capacitor 70 has impressed across its plates a voltage of −15 volts, as will be explained later. The result of providing the capacitor 70 in its position between the output of the amplifier 63 and the input of the amplifier 65 is that the sole input to the positive input terminal of the second operational amplifier 65 will be the voltage across the plates of the capacitor 70. This must be so because of the polarity of the diode 69, clearly shown in FIG. 1, which blocks the flow of any signal from the operational amplifier 63 which is more negative than that already on the capacitor 70. However, voltage across the capacitor 70 will be affected by the value of the output voltage of the first operational amplifier 63. In operation, the −15 volt value across the plates of the capacitor 70 will be changed to meet whatever voltage value is seen at the output of the first operational amplifier 63, so long as this voltage is more positive than the voltage across the capacitor plates. That is, assume that the output of the first operational amplifier 63 is initially −5 volts, corresponding to a glass thickness of fifty thousandths of an inch. The capacitor 70, having initially across its plates a voltage of −15 volts, will assume the less negative or more positive voltage value of −5 volts. Therefore, the voltage across the capacitor 70 will immediately become −5 volts, which will be impressed on the positive input terminal of the operational amplifier 65. Assume that the value of the thickness of the glass container, as represented by the voltage output of the operational amplifier 63, then rises from the value of fifty thousandths of an inch to sixty thousandths of an inch, thus giving an output of −6 volts. However, −6 is less positive than −5, which the capacitor 70 now holds as its voltage, and the voltage across the capacitor 70 will not change, but will remain at −5 volts. If, however, during the measuring of the glass container B, the thickness drops below fifty thousandths of an inch, and the output of the first operational amplifier 63 consequently assumes a value more positive than −5 volts, the voltage across the capacitor 70 will change to meet this lower voltage and will hold this lower voltage, continuing to transmit this to the second operational amplifier 65. The net result of this entire circuit is that after a glass container B has been completely gauged, the voltage value across the capacitor 70 will be equal numerically to the minimum glass thickness in thousandths of an inch seen by the probe 14 during the inspection of the glass container B. The operational amplifier 65 operates basically as an isolation amplifier to prevent rapid discharge of the capacitor 70 into the next stage in the readout circuit. Its function is to present a very high impedance to the next stage of the circuit so that the voltage held by the capacitor 70 can be held for a reasonable length of time to allow reading of the voltage on the capacitor 70.

At this point, the output of the isolation or second operation amplifier 65 could be used to directly drive a digital readout device to display the thickness of the container B which has been gauged. However, the thickness measuring system is designed such that the maximum glass thickness which can be measured accurately and which should be displayed is approximately seventy-five thousandths of an inch. As explained in copending application Attorney's docket number S-12953, this limit on the operational range of the gauge is strictly for commercial convenience, and therefore is not required for proper operation of the circuit. In this embodiment however, the output of the second operational amplifier 65 is connected through suitable electrical wiring 71 to a means 72 for limiting the maximum displayed thickness as represented by voltage. The means 72 has an operational amplifier 74, which is used as a simple inverter to change the sign or sense of the voltage from the second operational amplifier 65. The wire 71 is connected in series with an input resistor 73, which is connected to the negative input terminal of the operational amplifier 74. A fixed feedback resistor 75 is connected between the negative input terminal of the operational amplifier 74 and the output terminal of the operational amplifier 74. The values of the resistors 73 and 75 are substantially equal to obtain a unit gain through the operational amplifier 74 and constrain it to the function of a simple inverting amplifier. The output of the operational amplifier 74 is connected by a wire 76 to a digital readout means 78. In this example, the digital readout means 78 is shown as a digital volt meter, which may be a model 4220–N manufactured by the Triplett Corporation, Bluffton, Ohio. However, it is realized that the digital readout means 78 could be a pointer type voltage meter or other display device which is voltage responsive and will display as a direct digital reading the voltage introduced to it. A negative 15 volt power supply 80 is connected in series with two resistors 81 and 82. The resistor 82 is connected to the output terminal of the operational amplifier 74. The resistors 81 and 82 are sized, for the purposes of this specific example, such that the resistor 81 has a voltage drop of approximately two times the voltage drop across the resistor 82. A diode 84 is connected between the two resistors 81 and 82 at a circuit node 83 and to the negative input terminal of the operational amplifier 74. It will be noted that the polarity of the diode 84 is such that negative currents will not flow through it. Thus, so long as the output of the operation amplifier 74 is below 7.5 volts, there will be no current flowing through the diode 84. When the voltage output from the operational amplifier 74 does reach 7.5 volts, the voltage at the node 83 will be zero, and current will begin to flow through the diode 84. Before the output of the operational amplifier reaches 7.5 volts, the voltage at the node 83 will be negative in sign, and at values above 7.5 volts, the voltage at the node 83 will be positive in sign. Positive voltage at node 83 will allow current to flow back through the diode 84 and into the negative input terminal of the operational amplifier 74. This positive output into the negative input terminal limits the output of the operational amplifier 74, thus preventing the digital readout means 78 from displaying any value greater than 7.5 volts or a thickness of approximately seventy-five thousandths of an inch.

A reset means 86 is connected to the capacitor 70 by suitable electrical wiring 87 and 88. The reset means 86 in turn is connected to a gate means 90 for cycling or switching on the reset means 86 when a new inspection cycle begins. A voltage or power supply 92, which preferably is +15 volts, is connected through a switch 94 to electricial wiring 95 into the gate means 90. The switch 94 is controlled by the index of the inspection apparatus shown in the Schepler patent. So long as a container B is being inspected for thickness, the switch 94 will be closed, thus presenting a path from the voltage source 92 through the wire 95 into the gate means 90. When the inspection cycle is ended, and the container B is being indexed to another station for further inspection, the switch 94 is open, thus interrupting the path from the power supply 92 to the gate means 90. As the next inspection cycle begins, the switch 94 is closed, once again completing the path from the power supply 92. The wire 95 is connected in series with a resistor 96, which in turn is connected in series to the base of a first transistor 98. The emitter of the transistor 98 is connected through a wire 99 to ground. A second resistor 100 is connected between the resistor 96 and the base of the transistor 98 to a ground connection. The collector of the transistor 98 is connected through a third resistor 101 to the power supply 92. The collector of the transistor 98 is also connected to the base of a second transistor 102. The emitter of the transistor 102 is connected to ground through an electrical wire 104. The collector of the transistor 102 is connected to the base of a third transistor 106 by an electrical wire 105. A fourth resistor 108 is connected in series in the wire 105. A fifth resistor 110 connected between the base of the transistor 106 and the resistor 108 connects the base of the transistor 106 to the voltage source 92. The collector of the third transistor 106 is connected through a wire 111 to a diode 112 in series with the wire 111. A fixed resistor 113 is connected in series with the diode 112 and is further connected to the negative input terminal of the first operational amplifier 63 in the means 60 for holding the minimum value of glass thickness. A voltage supply 114, which for the purposes of this example should be negative or −15 volts, is connected through an electrical wire 115 to a sixth fixed resistor 116, which in turn is connected to the electrical wire 111 from the collector of the third transistor 106.

With the system just described, the functioning of the gate means 90 will now be described. So long as the switch 94 is open, there is no current to the base of the first transistor 98, and the transistor 98 is off. With the first transistor 98 off, the current from the voltage supply 92 has no available path to ground. Thus, the voltage supply 92 will furnish current, through the third resistor 101, to the base of the second transistor 102 and turn the second transistor 102 on. With the second transistor 102 on, there is a path through the resistors 108 and 110 to ground for the 15 volt power supply. Under this situation, the transistor 106 will also be turned on because, as will be noted, the emitter bias of the third transistor 106 is opposite that of the first two transistors 98 and 102, and it will therefore be turned on when the base voltage is lower than the emitter voltage. It may be seen that this will occur, since the +15 volt source normally appears at the emitter of the third transistor 106 and the grounding of the source 92 through the resistors 110 and 108 will present a somewhat lower voltage at the base of the third transistor 106. With the third transistor 106 on, a path for current from the voltage source 92 will be provided through the electrical wire 111 to the diode 112. With positive current from the source 92 passing through the diode 112 and into the negative terminal of the operational amplifier 63, the output of the operational amplifier 63 will be saturated and will go to a −15 volt level. With the output of the operational amplifier 63 at a −15 volt level, it should be apparent that whatever value is on the capacitor 70 at the time will be held, since this value will be less than −15 volts and therefore is less negative than the −15 volt signal produced at the output of the operational amplifier 63. This is the condition which prevails between gauging cycles when it is desired to hold the minimum value of thickness observed on a previously inspected glass container B on the capacitor 70 and read this value out as a constant value on the digital readout means 78. It may be noted that the −15 volt source 114 is, of course, still connected into the wire 111. However, the +15 volt source 92 will overcome any influence of the −15 volt source 114 and, thus, the source 114 will have no effect during this particular time. When the next gauging cycle is ready to begin, current from the power supply 92 will be transferred into the base of the transistor 98 through the resistor 96. This will occur when the switch 94 is closed as a result of the completion of the index and the presentment of a new glass container B for inspection. This will turn the transistor 98 on and create a path to ground for the voltage source 92 through the resistor 101 and the transistor 98. When this occurs, the second transistor 102 will be turned off, because there will no longer be any current available to the base of the second transistor 102. When the second transistor 102 turns off, there will no longer be a path to ground available through the resistors 110 and 108 for the voltage source 92, and consequently the third transistor 106 will also be turned off. It will be noted now, at this point, that the 15 volt signal from the voltage source 92 may pass through the resistors 110 and 108 and out a wire 117, which is connected to the reset means 86. This path, of course, is always in existence, but with the transistors 102 and 106 on, the current from the voltage source 92 would not flow thorugh the path presented by the wire 117, preferring rather to take the path to ground presented through the transistor 102. Thus, as soon as the switch 94 closes, indicating the beginning of another gauging cycle, a voltage is avaiable on the wire 117 into the reset means 86. Additionally, at this time, the voltage source 114 which furnishes a −15 volt signal, will transmit this −15 volt signal through the wire 111 to the diode 112. As may be seen, the diode 112 is positioned such that it will not pass any negative currents. However, this voltage is presented at the input to the diode 112 to prevent any possibility of any positive current leakages through the transistor 106 into the operational amplifier 63 during the time the transistor 106 is supposed to be off. Occasionally, small positive current leakages may occur, even though the transistor 106 is off, and the negative voltage supply 114 prevents any false or incorrect readings in the operational amplifier 63 as a result of any such possible positive current leakages.

The wire 117 is connected to a one shot or monostable multivibrator 120. The one shot 120 may be an Amelco model 342–Cl, manufactured by Amelco Semiconductor, 1300 Terra Bella Avenue, Mountain View, California 94040. The operation of a one shot is well known to those skilled in the art. It is a device which will give a single output voltage pulse, of a controllable duration, each time it receives a voltage input. The voltage input to the one shot may be a continuous voltage, but it will still give only a short duration output pulse each time the voltage comes on into it. Thus, it should be realized that the voltage source 92 will be present in the line 117 all during the time that a container B is being measured. However, the one shot 120 will give an output pulse only when the voltage initially comes on. This pulse will be of a short duration, and will not continue for the entire gauging period. The output of the one shot 120 is through an electrical line 121. A first resistor 122 is connected in series with the output line 121. The resistor 122 is connected to the base of a first transistor 124. The emitter of the first transistor 124 is connected to ground through a diode 125. The diode 125 is provided as a bias for the first transistor 124 to raise the voltage of the emitter of the first transistor 124 to a potential above ground level. The emitter of the first transistor 124 is also connected, through a second resistor 126, to the voltage supply 92. The current through the resistor 126 maintains the bias voltage on the diode 125. The collector of the first transistor 124 is connected, through a third resistor 128, to the base of a second transistor 130. A fourth resistor 132 is connected between the third resistor 128 and the base of the second transistor 130. The fourth resistor 132 is also connected to the voltage supply 92. The voltage supply 92 is also connected to the emitter of the second transistor 130. The collector of the second transistor 130 is connected through a fifth resistor 134 to the base of a third transistor 136. The collector of the third transistor 136 is connected to the electrical wire 88, and the emitter of the third transistor 136 is connected to the electrical wire 87. As previously noted, the capacitor 70 is connected between the electrical wires 87 and 88. The voltage supply 114 is connected through an electrical wire 138 to the wire 87. The circuit is completed by a sixth resistor 137 which connects the base of the first transistor 124 to ground and a seventh resistor 140 which connects the base of the third transistor 136 to the wire 138 from the voltage source 114.

So long as there is no current present in the wire 121 from the one shot 120, all three of the transistors 124, 130 and 136 will be off. This must be true, since the lack of any current to the base of the transistor 124 requires it to be off. Before the transistor 130 can be turned on, there must be a path available for current through the transistor 124 to allow the base voltage of the transistor 130 to be less than the emitter voltage. Note that the transistor 130 has the emitter arrow indicating a current path such that the base voltage must be less than the emitter voltage before the transistor 130 will be turned on. Likewise, the transistor 136 must receive current through the transistor 130 before it can be turned on. When the one shot 120 delivers its single pulse along the electrical line 121, the transistor 124 will be turned on. With the transistor 124 turned on, there is a path available for the current from the voltage supply 92 through the resistor 132, the resistor 128, the transistor 124, and the diode 125 to ground. There will be a voltage drop across the resistor 128, thereby reducing the base voltage for the transistor 130 below the emitter voltage, which it may be seen will always be +15 volts, which will thereby turn on the transistor 130. When the transistor 130 is turned on, current may flow through the transistor 130, through the resistor 134, and into the base of the transistor 136, thus turning the transistor 136 on. With the transistor 136 on, there is a complete circuit between the electrical wires 87 and 88 which contain the capacitor 70. With the electrical wires 87 and 88 connected through the transistor 136, the −15 volt power supply 114 may charge the capacitor 70 to a value of −15 volts. This then resets the capacitor 70 to receive and hold the minimum thickness value for any glass container B being gauged. The signal through the electrical wire 121 from the one shot 120 is of very short duration. However, this signal has been of long enough duration to reset the capacitor 70. With the signal in the electrical line 121 gone, all three of the transistors 124, 130 and 136 are turned off to await the next signal from the one shot 120 to reset the capacitor 70 to a value of −15 volts.

In order to properly calibrate this circuit, a switch 142 is closed by the gauge operator, which connects the voltage or power supply 92 to two output lines 144 and 146. The output line 144 is connected to the operating coil 50 of the relay 41. When the operating coil 50 is energized, as previously explained, the movable switch arms 48 and 49 will be moved from the position shown in FIG. 1 to connect to the contacts 44 and 46. In addition, the output line 146 is connected to the wire 95, which in turn is connected into the gate means 90. The signal from the wire 146 into the gate means 90 is equivalent to receiving a signal from the power supply 92 through the switch 94. The net effect of this sequence is to reset the capacitor 70 to a −15 volt level ready to accept a minimum glass thickness. Prior to this, the potentiometer 26 has been set to a specific desired voltage level. This, of course, is equivalent to a desired thickness level in operation. However, in the calibration situation, the setting on the potentiometer 26 does not correspond to any particular rejection level, but may be any thickness value which is convenient, since no actual measurement of a container B is made during this procedure. This voltage will be applied through an electrical wire 148, connected to the potentiometer tap 25, to the contact 44 of the relay 41. This in turn will then be conducted through the switch arm 48 into the scaling means 36, the means for holding the minimum value 60, the means to limit the maximum displayed voltage 72, and, finally, into the digital display means 78. Ideally, the digital display means 78 would show a number numerically equal to a thickness level as represented by the setting chosen for the potentiometer 26. However, it is usually necessary to adjust the potentiometer 57 slightly to vary the scaling factor of the scaling means 36 to get an exact correlation between the setting of the potentiometer 26 and that shown by the digital display means 78. It is, of course, to be understood that the setting of the potentiometer 26 is the value which actually determines the minimum thickness of glass which is acceptable. Any glass which is below this minimum acceptable thickness will be discharged as being defective. In addition to operating the switch arm 48, the relay coil 50 likewise operates the switch arm 49. In this case, the contact 46 connected to the operating arm 49 provides a short circuit through the electrical wires 150 and 151 around the diode 69. This is done to remove the blocking effect of the diode 69 during calibration. Under normal operating conditions, the output voltage from the operational amplifier 63 is varying as the thickness of a container B varies. In the calibration situation, the output from the operational amplifier 63 is a constant value as set by the potentiometer 26 and modified by the scaling means 36. Thus, the capacitor 70 assumes a generally steady state value. In the calibration procedure, it may be necessary to raise and lower the value of the voltage across the capacitor 70 as the variable resistor 57 is adjusted to make the reading of the digital display means 78 precisely agree with the reading set on the potentiometer. If the diode 69 were not removed from circuit in the calibration procedure, it would not be possible to adjust the reading of the digital display means 78 up and down, as may be necessary for calibration, since, as previously explained, the purpose of the diode 69 is to prevent the capacitor 70 from ever assuming any value less positive than the minimum value it has reached up to that time during a gauging cycle. It should be realized, that in the most general sense, the digital readout means 78 may be considered to be any visual means for representing the voltage value of the minimum article thickness held by the means 60 for holding the minimum value of thickness of each article measured.

What we claim is:

1. In an apparatus for measuring the thickness of an article formed from a dielectric material wherein an antenna is used to establish a radio frequency field outwardly in the direction of an article positioned adjacent thereto; a probe is positioned in said field adjacent to said article; the voltage induced in said probe is an index of the thickness of that portion of said article immediately in front of said probe; a compensated reference voltage is generated during periods when no article is present and held as a constant voltage during periods when an article is present; said induced voltage and said compensated reference voltage are summed to generate a thickness voltage signal which is a measure of article thickness following a linear voltage versus thickness curve; said thickness voltage signal is compared with a pre-selected minimum level voltage signal, set by a variable voltage level means to provide a reject signal when the thickness of said article is below a pre-selected thickness level; and said reject signal is transmitted to a reject control mechanism for rejecting articles exhibiting a signal level below said pre-selected level, the improvement in said apparatus which comprises, in combination:

a. a first voltage source for supplying a constant voltage;

b. scaling means, connected to said thickness voltage signal, for amplifying said thickness voltage signal a pre-selected amount to obtain an output voltage signal having a numerical value substantially equal to the numerical value of the thickness of said article;

c. means, connected to the output of said scaling means, for holding the minimum value of thickness of each article measured, as represented by said output voltage of said scaling means;

d. visual means, connected to said means for holding the minimum value of thickness of each article measured, for representing the value of the minimum article thickness held by said means for holding the minimum value of thickness of each article measured;

e. reset means, connected to said means for holding the minimum value of thicknesses of each article measured and to said first voltage source, for resetting said means for holding the minimum value of thickness of each article measured, as the measurement of a new article is started, to displace a prior minimum thickness value and accept and hold a new minimum thickness value;

f. a second voltage source for supplying a constant voltage connected to said reset means;

g. gate means, connected to said first and second voltage sources and to said reset means, for generating a signal to cause said reset means to operate in response to the beginning of the measurement of a new article; and h. timing means, connected to said first voltage source and said gate means, for switching said gate means on when an article is being measured and for switching said gate means off when an article is not being measured.

2. The apparatus of claim 1, further including:
switching means, connected to said gate means, said means for holding the minimum value of thickness of each article measured, said variable voltage level means, connected in circuit between said thickness voltage signal and said scaling means, for connecting either a voltage set by said variable voltage level means or said thickness voltage signal to said scaling means.

3. The apparatus of claim 1, further including:
means, connected in circuit between the output of said means for holding the minimum value of thickness of each article measured and said visual means, for limiting the represented thickness, as indicated by said output voltage of said means for holding the minimum value of thickness of each article measured, to a pre-selected maximum value.

4. The apparatus of claim 1, wherein said scaling means comprises, in combination:

a. an operational amplifier having at least two input terminals and one output terminal;
b. an input resistor connected to a first input terminal of said operational amplifier and to said thickness voltage signal;
c. a fixed feedback resistor connected between the output terminal of said operational amplifier and said first input terminal of said operational amplifier; and
d. a variable resistor connected in series with said fixed feedback resistor, the combined effect of said input resistor, said fixed feedback resistor, and said variable resistor being such that the output of said operational amplifier is a voltage which is substantially numerically equal to the thickness of an article being measured.

5. The apparatus of claim 1, wherein said means for holding the minimum value of thickness of each article measured comprises, in combination:
a. a first operational amplifier having at least two input terminals and one output terminal;
b. a first fixed input resistor connected in series with the output of said scaling means and to a first input terminal of said first operational amplifier;
c. a second operational amplifier having at least two input terminals and one output terminal;
d. a first diode, connected to said first input terminal of said first operational amplifier and to said gate means, said diode being positioned to prevent current flow therethrough when said articles are being measured and to allow current flow therethrough when said articles are not being measured;
e. a second fixed input resistor connected in series with said first diode between said first diode and said first input terminal of said first operational amplifier;
f. a second diode connected in series between the output terminal of said first operational amplifier and a first input terminal of said second operational amplifier, said second diode being polarized to allow passage of the output of said first operational amplifier to said second operational amplifier only if the output from said first operational amplifier represents a lesser minimum value of thickness than that represented by the output of said second operational amplifier;
g. a fixed feedback resistor connected between said first input terminal of said first operational amplifier and the output terminal of said second operational amplifier; and
h. a capacitor connected between said second diode and said first input terminal of said second operational amplifier and also connected to said reset means, said capacitor receiving a pre-selected voltage charge from said reset means as the measurement of an article is begun and holding the minimum thickness measured of each article, as a function of the output voltage of said first operational amplifier, until a new measurement cycle is started.

6. The apparatus of claim 1, wherein said reset means comprises, in combination:
a. a monostable multivibrator having an input terminal and an output terminal, with its input terminal connected to the output of said gate means, for supplying a short duration pulse when the measurement of an article is started;
b. a first transistor having a base, a collector and an emitter;
c. a first resistor connected in series between the output terminal of said monostable multivibrator and the base of said first transistor, said first transistor being biased to be off so long as no current is passed by said monostable multivibrator through said first resistor;
d. a second resistor connected to said first voltage supply and the emitter of said first transistor;
e. a diode connected to ground and to the emitter of said first transistor for setting a bias voltage on the emitter of said first transistor;
f. a second transistor having a base, a collector and an emitter;
g. a third resistor connected in series between the collector of said first transistor and the base of said second transistor, said second transistor being biased to be off so long as said first transistor is off;
h. a fourth resistor connected to said first voltage source and connected between said third resistor and the base of said second transistor;
i. a third transistor having a base, a collector and an emitter;
j. a fifth resistor connected in series between the collector of said second transistor and the base of said third transistor, said third transistor being biased to be off so long as said second transistor is off;
k. means, connected to the emitter and collector of said third transistor and to said second voltage source, for connecting said second voltage source to said means for holding the minimum value of thickness of each article measured when said third transistor is on;
l. a sixth resistor connected between the base of said first transistor and a ground connection; and
m. a seventh resistor connected between the base of said third transistor and said second voltage supply.

7. The apparatus of claim 1, wherein said gate means comprises, in combination:
a. a first resistor connected in series to said timing means;
b. a first transistor, having a base, a collector and an emitter, having its base connected in series to said first resistor and its emitter connected to ground, and biased to be on only when an article is being measured;
c. a second resistor connected between the base of said first transistor and a ground connection;
d. a second transistor, having a base, a collector and an emitter, having its base connected to the collector of said first transistor and its emitter connected to ground, said second transistor being biased to be off when said first transistor is on;
e. a third resistor connected to said first voltage source and connected in circuit between the collector of said first transistor and the base of said second transistor;
f. a third transistor, having a base, a collector and an emitter, having its base connected to the collector of said second transistor, its emitter connected to said first voltage source, and its collector connected to said means for holding the minimum value of thickness of each article measured, said third transistor being biased to be off when said first transistor is on;

g. a fourth resistor, connected in series between the collector of said second transistor and the base of said third transistor;

h. a fifth resistor connected to said first voltage source and connected in circuit between said fourth resistor and the base of said third transistor;

i. an electrical wire connected in circuit between said fourth resistor and the collector of said second transistor and connected to said reset means for carrying a signal to said reset means while an article is being measured; and j. a sixth resistor, connected to said second voltage source and connected to the collector of said third transistor.

8. The apparatus of claim 2, wherein said switching means comprises, in combination:

a. an electrically operated relay having at least two pairs of contact terminals;

b. a first movable switch arm, normally connected to a first one of a first pair of said two pairs of contact terminals and connected to said scaling means;

c. means for connecting said first terminal of said first pair of contact terminals to said thickness voltage signal;

d. means for connecting said second terminal of said first pair of contact terminals to said variable voltage level means;

e. a second movable switch arm, normally connected to a first one of a second pair of said two pairs of contact terminals and connected to said means for holding the minimum value of thickness of each article measured, said first one of said second pair of contact terminals being connected to present an open circuit to said second movable switch arm;

f. means for connecting said second terminal of said second pair of contact terminals to said means for holding the minimum value of thickness of each article measured;

g. an operating coil within said relay for moving said switch arms from contact with said first terminals of said first and second pairs of contact terminals into contact with said second terminals of said first and second pairs of contact terminals when said operating coil is energized; and h. a normally open switch connected in series between said first voltage source and said operating coil, whereby closing said normally open switch will connect said first voltage source to said operating coil.

9. The apparatus of claim 3, wherein said means for limiting the represented thickness to a pre-selected maximum value comprises, in combination:

a. an operational amplifier having at least two input terminals, one of which is connected to ground, and one output terminal connected to said visual means;

b. a fixed input resistor connected in series between the output of said means for holding the minimum value of thickness of each article measured and an ungrounded input terminal of said operational amplifier;

c. a fixed feedback resistor connected between the output terminal of said operational amplifier and the input of said operational amplifier to which said fixed input resistor is connected;

d. a biasing voltage source having a voltage sign opposite that of the voltage output of said operational amplifier and a value greater than the maximum expected thickness of said articles as measured in terms of voltage;

e. a first resistor connected to said biasing voltage source;

f. a second resistor connected in series with said first resistor and connected to the output terminal of said operational amplifier;

g. a diode connected to the input terminal of said operational amplifier to which said fixed input resistor is connected and connected between said first and second resistors, said diode being constrained to be nonconductive as a result of the voltage divider defined by the relative values of said first and second resistors, so long as the output voltage of said operational amplifier is below said pre-selected maximum and to be conductive so long as the output of said operational amplifier is above said pre-selected maximum value, said operational amplifier being limited and thereby incapable of any output greater than said pre-selected maximum when said diode is conductive.

10. In a method for inspecting dielectric articles wherein a radio frequency field is provided at an inspection station; an attenuated signal of said field is detected as an index of the thickness of an article placed in said field; a compensated reference signal is generated during periods when no article is present in said inspection station and held as a constant value when articles are present in said inspection station; and said attenuated signal and said compensated reference signal are summed to give an output voltage signal which is a measure of the thickness of said article following a linear voltage versus thickness curve, the improvement in said method which comprises the steps of:

a. electronically scaling said thickness voltage signal to obtain a modified thickness voltage signal which is substantially numerically equal to the thickness of said article as represented by said thickness voltage signal;

b. electronically holding the minimum value of said modified thickness voltage signal obtained during the inspection of each article; and c. displaying said minimum value.

11. The method of claim 10, further including the step of:

d. electronically erasing said held minimum value as the inspection of a new article begins to allow holding of a new minimum value.

12. The method of claim 10, further including the step of:

d. constraining the display of said minimum value to no more than a pre-selected maximum thickness value.

* * * * *